Oct. 4, 1955  O. BRUMMER ET AL  2,719,743
OIL SEAL MEANS
Filed Aug. 16, 1952
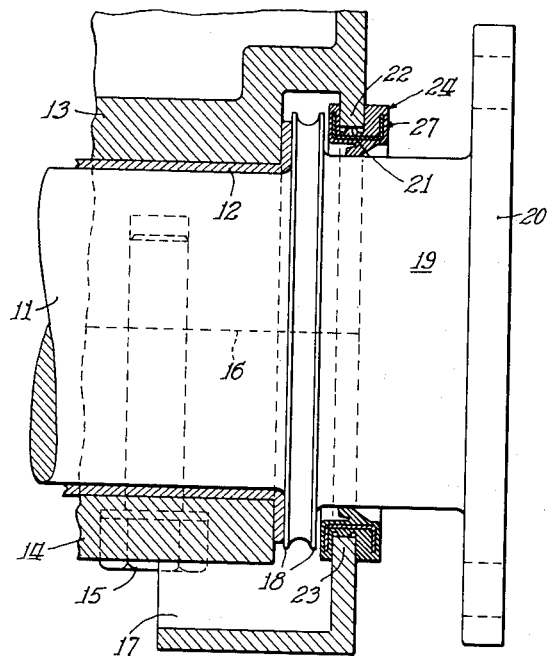
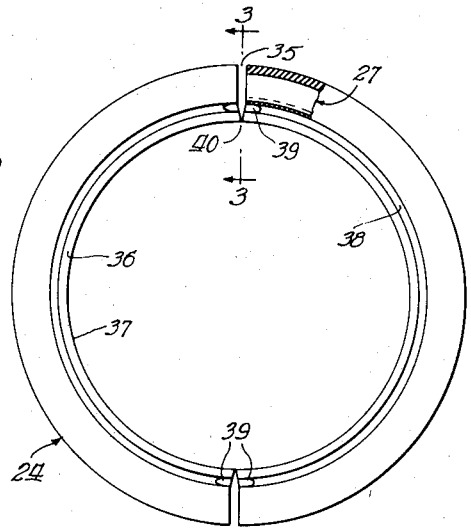
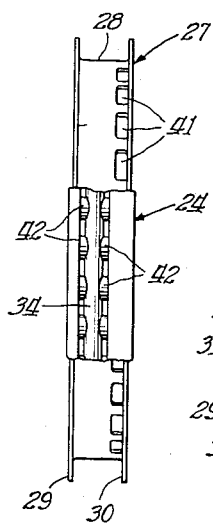
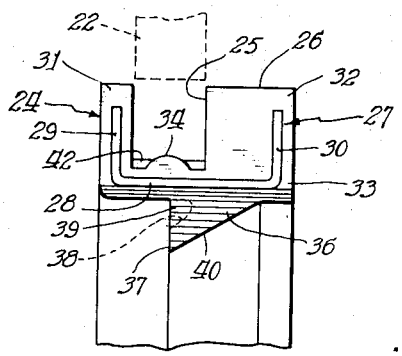
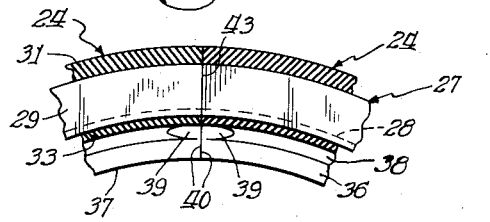
Inventors:
Olin Brummer,
Elmer F. Heimbuch
and Andrew Eadie.
By: Jones, Tesch & Darbo
Attys.

United States Patent Office 2,719,743
Patented Oct. 4, 1955

2,719,743

OIL SEAL MEANS

Olin Brummer and Elmer F. Heimbuch, Chicago Heights, and Andrew Eadie, Homewood, Ill.

Application August 16, 1952, Serial No. 304,766

2 Claims. (Cl. 288—2)

This invention relates to improved oil seal means or the like, more particularly for sealing oil or other lubricant against leakage around a rotating shaft, as, for example, the rear main bearing for the crank shaft of an internal combustion engine.

This invention is of particular utility for use with relatively rotatable elements one of which elements has an annular flange extending toward the other element and the space between which is desired to be sealed.

An important object of the present invention is the simplification and improvement of a two-piece annular seal of the class referred to, the effectiveness of the seal and its ease and security of application being enhanced without the necessity of using screws, bolts, or other fastening means or extraneous springs.

A further object of the present invention is the provision of an arcuate seal piece having a metallic insert of an improved character which is rigid to resist torsional stresses, while having a body of elastomeric or rubber-like material in which the insert is embedded, and the insert having perforations spaced therealong to facilitate flow of rubber between the various parts of the seal body.

Another object of the invention is the provision of having the metallic insert extend out to the end face of the arcuate piece whereby the metal inserts of adjacent complementary seal pieces are in abutment when the two seal pieces are placed in position about a shaft to form a complete annulus.

Another object of the invention is that while the metallic insert extends out to the end of the seal piece the sealing lip of the seal piece is tapered towards its distal edge to extend beyond the end face so that a rubber to rubber contact under compression is provided at the interfaces of the mating ends of the seal halves or pieces.

Another object of the invention is the provision of fillets between the body and the sealing lip at each end of the arcuate body piece.

Another object is the provision of circumferentially spaced beads in the inner surface of the groove of the seal body to enhance the sealing effect.

These and other objects and advantages of the present invention will be apparent from the following description, taken together with the accompanying drawings, of an illustrative embodiment of the invention, and in which drawings—

Figure 1 is a sectional view of pertinent parts of the motor block or similar housing with means following the present invention applied thereto and to the motor crank shaft;

Figure 2 is a face view of a complete seal device following the present invention, separated from the remainder of the structure of Fig. 1, and looking at the seal device from the left-hand side of the structure as seen in Fig. 1 prior to being clamped in the motor housing;

Figure 3 is an enlarged end view of a seal piece taken on the lines 3—3 of Fig. 2, and indicating, in broken lines, other parts with which the seal means is subsequently assembled;

Figure 4 is a plan view of the metal insert showing a fragmentary portion of the body; and Figure 5 is a fragmentary sectional view of two mating arcuate seal pieces showing the interface thereof when under compression in the motor housing to form a complete annulus in sealing position.

Referring in detail to the illustrative construction shown in the drawings, the numeral 11 may indicate the crank shaft of an internal combustion engine or motor which is journaled as by a bearing sleeve 12 in the mating semi-cylindrical sections 13 and 14 of the engine block, these sections being suitably secured together by the usual machine bolts one of which is indicated at 15. The motor block bearing may be split on the line 16 and may include an oil chamber 17 within which rotates the oil throw flanges 18 that are integral with the crank shaft 11 and beyond which the crank shaft may be extended as at 19 to project from the engine block and being there conventionally enlarged as at 20 for having secured thereto the customary flywheel, which need not be here shown. The structure just described in this instance constitutes the rear main bearing of the engine. The opening 21 is commonly margined by the mating halves 22 and 23 of the motor block housing flange. It is the opening 21, through which the crank shaft projects, as at 19, that is desired to be sealed against the leakage of oil therethrough along the shaft, and to which accomplishment the improved seal means of the present invention is directed.

The seal means of the present invention is an improvement on that disclosed in the copending application of Olin Brummer, Serial No. 174,932, filed July 20, 1950, now U. S. Patent No. 2,647,002, and as such each half-circle piece of the two-piece seal disclosed embodies an arcuate body 24 of elastomeric or rubber-like material, for example, one of the resilient synthetic elastomers that may be readily molded under the influence of heat and pressure to the desired form and when which set will withstand heat, cold, lubricants and chemicals without appreciable deterioration. The arcuate body 24 is shown in the form of a semi-circle and two such half-seals or bodies 24 are abutted, ends to ends, to provide a complete circle making up an operative annular sealing means.

As described and claimed in said copending Brummer application, a body 24 is adapted to interlock with the marginal flange portion 22 or 23, as the case may be, of the motor block, there being one of the arcuate pieces 24 for each side marginal portion, and for this purpose the body has a peripheral groove 25 (Fig. 3) opening radially into the axially extending face 26 of the body. The body is of sufficient thickness radially so that the motor block 22 or 23 is received to a substantial extent therein to provide a secure interlocking effect and to anchor the body on the flange in sealing position. Further in accordance with the said copending Brummer application, the novel metallic insert or skeleton 27 is embedded in the body during the molding step, this insert being of channel-shape in cross-section and having an axially extending portion 28 and two outwardly radially extending side walls 29 and 30, the groove portion of the body being therebetween so that the side wall 29 extends well into the body portion 31 on one side of the groove and the side wall 30 well into the body portion 32 on the opposite side of the groove, the portion 28 of the insert being disposed axially in the connecting body part 33, and the body at the bottom or floor of the groove 25 having an integral hump or camber 34 for enhanced engagement with the motor block flange.

When a "half seal" or a "semi-circle" is referred to in this instance, it is to be understood that the arcuate seal pieces as molded are slightly more than half circles, i. e. each is slightly greater than a 180 degree arc, to insure sealing abutment of the seal parts at their interfaces when the arcuate pieces are clamped together in the motor housing to form an annulus.

In accordance with the present invention, in improvement upon the seal of the said copending Brummer application, the metallic channel-shape insert 27, as best seen in Fig. 2, extends out to the end face of the arcuate body piece to be substantially flush therewith as at 35. It will be understood that in molding there may be a slight film of the synthetic over the end of the metal insert which is not desired but if sufficiently thin does no harm and may be ignored, since the metal members under compression may readily be advantageously forced into substantial abutment contact through the film.

Further in accordance with the present invention the body 24 carries an integral inwardly extending arcuate sealing lip 36 which in this instance desirably extends obliquely inwardly from the body 24, and, advantageously from adjacent the thicker side portion 32 of the body to a point or distal edge 37, the plane of which desirably substantially bisects the camber floor 34 of the body groove 25. Between this distal edge 37 of the sealing lip 36 and the body 24 there is advantageously an undercut 38, which enhances the adaptability of the sealing lip 37 to engage, as by a running seal fit, with the crank shaft, and, in this instance, the portion 19 of the crank shaft lying between the motor block flanges 22 and 23. In accordance with the present invention, the undercut 38 does not extend to the end face of the body piece, since, adjacent each end face, there is a fillet 39 of body material between the body and the sealing lip, thus closing the undercut 38 at these ends and making the end faces smooth throughout.

Further in accordance with the present invention, the sealing lip 36 is tapered slightly toward its distal edge 37 to extend beyond the end face 35 of the body as at 40 (Fig. 2), for a purpose presently pointed out.

Still further in accordance with the present invention, the metallic insert 27 has a series of perforations such as 41 spaced therealong circumferentially to facilitate flow of synthetic between the various parts of the seal body during the molding step, and advantageously these perforations 41 are in the insert axially-extending portion 28 and to the side thereof adjacent the junction of the sealing lip 36 with the body so that the synthetic may flow freely into the lip during molding.

Also further in accordance with the present invention, not only does the bottom or floor of the body groove 25 have the camber 34 but it also has a row of circumferentially spaced beads 42 (Fig. 4) along each side of the camber 34 to further enhance the sealing engagement of the body with the flange of the motor housing.

Turning now to Fig. 5, this view shows a fragmentary sectional view of two of the mating ends of the seal body pieces when in position as shown in Fig. 1 and under compression. It will be seen that when the two arcuate pieces of the annular seal are pressed together in the motor housing, as they are when in operative position, the ends of the metal channels 27 of adjacent arcuate seal pieces are brought into abutment thus preventing distortion of the seal means. At the same time the tapered or slanting end faces 40 of the sealing lips are compressed to provide a rubber-to-rubber seal at this point which is further enhanced by the fillets 39 at the ends of the undercuts 38, thus effecting a coplanar interface 43 for the seal piece ends at each diametrically opposite location of the complete seal annulus but with the sealing lip ends, because of the initial taper 40, under greater compression than the body portion. This insures against any opening between the sealing lip ends through which undesired lubricant might otherwise escape. At the same time, the sealing lip ends are maintained in this hyper-compression by the abutment of the body pieces 24 and particularly the abutting ends of the metallic inserts 27 in the body pieces. The channel shape of the metallic inserts assists in registry of the insert ends and prevents slippage of one over the other under compression.

It was pointed out in the copending Brummer application that under the influence of hot oil in the crank case some swelling of the body material is present after installation and use of the seal, and the present invention contributes still further to the control of such swelling so that both the interlock between the flange of the motor housing and the groove in the seal body becomes more secure and also so that the seal at the interface between the arcuate body pieces forming the complete seal annulus is enhanced.

Such changes may be made as fall within the scope of the appended claims without departing from the invention.

What is here claimed is:

1. In oil seal means or the like for use between relatively rotatable elements, an arcuate body of elastomeric material for mounting on one of said elements, said body having a radially opening peripheral groove therein, an arcuate metal insert channel-shape in cross-section embedded in said body and having an axially extending portion and side walls extending on each side of said groove respectively from opposite margins of the axially extending portion, perforations in said insert axially extending portion spaced circumferentially therealong, and an integral sealing lip extending radially of said body oppositely of said groove for running sealing engagement with the other of said elements, said groove having a circumferential camber formation along its bottom surface and a row of circumferentially spaced bead-like projections arranged along the bottom of said groove on each side of said camber formation, said insert axially extending portion being radially aligned with the junction of said sealing lip and said body.

2. In oil seal means or the like for use between relatively rotatable elements, an arcuate body of elastomeric material for mounting on one of said elements, said body having a radially opening groove therein and an end face at each end thereof, an arcuate metal insert channel-shape in cross-section embedded in said body, said insert having an axially extending portion and side walls extending on each side of said groove respectively from opposite margins of said axially extending portion, said metal insert extending to the end faces of the body and terminating substantially flush therewith, and an integral sealing lip portion extending radially of said body oppositely of said groove to a distal edge adapted to have running sealing engagement with the other of said elements, said axially extending portion having perforations therein at least adjacent the end faces of the body and said lip being tapered toward said distal edge in a radial direction and extending beyond said insert in the direction of the arcuation of the body.

References Cited in the file of this patent

UNITED STATES PATENTS

| | | |
|---|---|---|
| 2,209,578 | Rainey et al. | July 30, 1940 |
| 2,348,586 | Antonelli | May 9, 1944 |
| 2,465,175 | Schwartz et al. | Mar. 22, 1949 |
| 2,480,116 | Brummer | Aug. 30, 1949 |
| 2,565,190 | Winkeljohn | Aug. 21, 1951 |
| 2,647,002 | Brummer | July 28, 1953 |

FOREIGN PATENTS

| | | |
|---|---|---|
| 478,136 | Great Britain | Jan. 10, 1938 |
| 544,732 | Great Britain | Apr. 24, 1942 |